March 6, 1934.  L. H. VOLD  1,949,518
REFRIGERATING SYSTEM
Filed Sept. 11, 1931
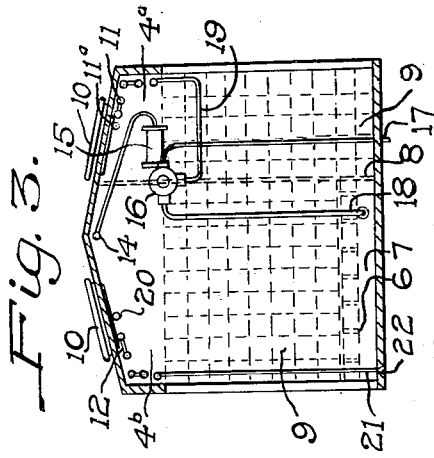
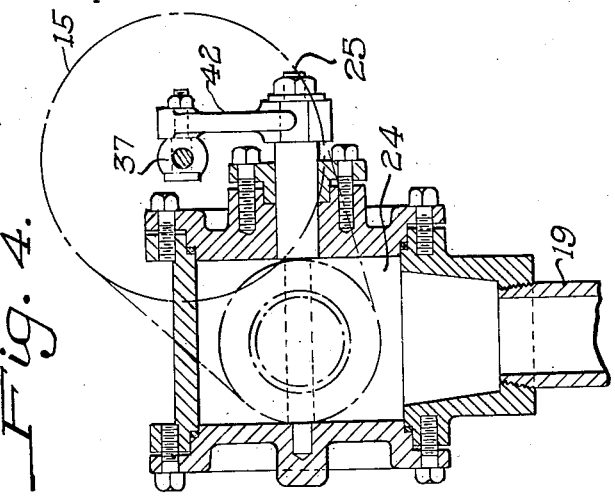
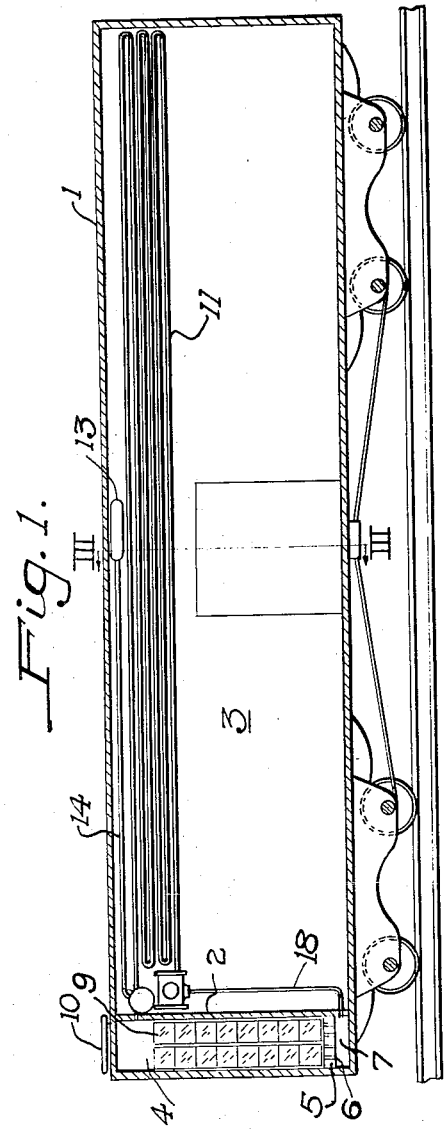
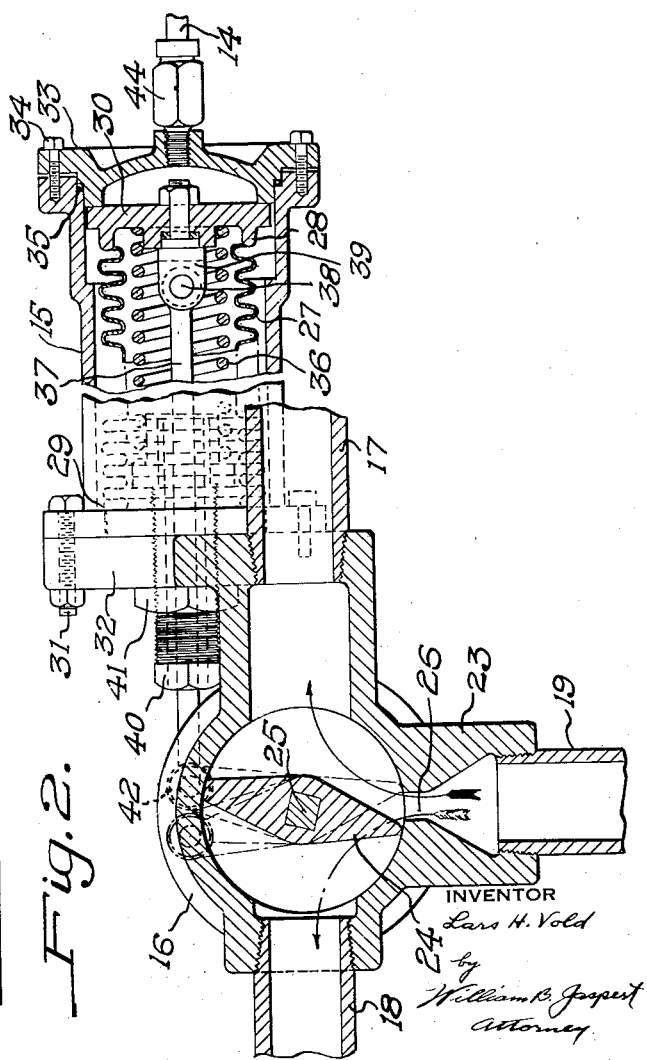
INVENTOR
Lars H. Vold
by
William B. Jaspert
Attorney Patented Mar. 6, 1934

1,949,518

UNITED STATES PATENT OFFICE 1,949,518

REFRIGERATING SYSTEM

Lars H. Vold, Butler, Pa.

Application September 11, 1931, Serial No. 562,256

6 Claims. (Cl. 62—91.5)

This invention relates to improvements in systems of refrigeration, more particularly to systems utilizing dry ice, frozen carbon dioxide ($CO_2$) as a refrigerant, and it is among the objects of this invention to provide means for utilizing evaporated carbon dioxide gas from one or more compartments to stimulate evaporization in another or other compartments.

A further object of the invention is the provision of simple and efficient means for controlling the temperature in cooling compartments in an expedient and convenient manner.

These and other objects of the invention will become more apparent from a consideration of the accompanying drawing in which like reference characters designate like parts and in which:

Figure 1 is a longitudinal cross-sectional view of a refrigerating car embodying the principles of this invention;

Figure 2 a cross-sectional view of a deflector valve operated by thermostatic control;

Figure 3 a transverse section taken through the cooling compartment of the refrigerator car along the line III—III of Figure 1; and Figure 4 a cross-sectional view of the deflector valve of Figure 2.

With reference to the several figures of the drawing, 1 designates a car body having a partition wall 2 at one end thereof, dividing the car into a cooling chamber 3 and a frozen carbon dioxide compartment generally designated at 4, but being divided by wall 8 into two compartments 4a and 4b the frozen carbon dioxide 4b being provided with a perforated partition 5 having perforations 6 therein forming a lower compartment 7. The frozen carbon dioxide cubes 9 are placed in the compartments through openings provided on the roof of the car and which are sealed by covers 10.

A system of piping 11 and 12 extends throughout the cooling chamber 3 of the car and is of such length that the gases circulating through the piping will be of substantially the same temperature as the cooling chamber when they leave the circulating system.

The circulation of the cooling medium is effected in response to temperature variations in a bulb 13 containing a liquid sensitive to heat such as ammonia, the bulb being connected by a pipe 14 to a cylinder 15 connected to the deflector valve generally designated at 16. The deflector valve 16 is provided with connections 17, 18 and 19 which communicate with the atmosphere, the chamber 7, and the circulating piping 11 respectively. The piping 12 communicates at 20 with the frozen carbon dioxide chamber 4b and through pipe 21 with the atmosphere at 22.

The cylinder 15 and deflector valve 16 are more clearly shown in Figure 2 of the drawing and consists of valve body 23 in which the deflector 24 is disposed, the deflector being mounted on a rock shaft 25 to which it is keyed. The deflector is designed to control the port 26 leading from the circulating piping 11 for the purpose of directing the flow of gases from the pipe 19 to either the atmosphere through the pipe 17 when the deflector is in the position shown in the drawing, or to the chamber 7 through the pipe 18 when the deflector is in the position shown by dotted lines in the drawing.

Disposed within the cylinder 15 is a bellows 27 that is soldered at its ends 28 and 29 to a disk 30 and to the cylinder casing respectively. Cylinder 15 is clamped by screw bolts 31 to flange 32 of the deflector valve body and an end cap 33 is bolted to the flange of the cylinder 15 by screws 34, a packing 35 being disposed between the cylinder and end cap to effect an air tight chamber within the cylinder.

A coil spring 36 is disposed within the bellows 27 and a rod 37 is pivoted at 38 to a yoke 39 fastened to the disk 30 as shown. The rod 37 extends through a screw plug or sleeve 40 which is threaded in the end flange 32 and locked by a nut 41. The extended portion of the rod 37 is connected to lever 42 of the rock shaft 25 which manipulates the deflector 24.

Attached to the cylinder head 33 is a coupling 44 that connects the pipe line 14 of Figure 1 with the chamber of cylinder 15 and bulb 13.

The operation of the above described refrigerating system is briefly as follows: Assuming that the frozen carbon dioxide compartments are charged with frozen carbon dioxide cubes 9 and that the cooling compartment 3 is warm, the liquid in bulb 13 will evaporate under the influence of heat and create a pressure in chamber of cylinder 15 against the disk 30 overcoming the pressure of the coil spring 36 and moving the disk 30 towards the stop shoulder provided in the cylinder. Movement of the disk 30 will cause the rod 37 to move longitudinally thereby operating lever 42 and rocking the deflector shaft 25 to dispose the deflector 24 in the position shown in dotted lines in Figure 2, whereby communication is established between pipes 18 and 19 through the port 26, and the pipe 17 leading to the atmosphere is simultaneously disconnected from the circulating system.

There will be some carbon dioxide gas generated in the compartment 4a due to heat penetration through the walls of the compartment and such carbonic acid gas will enter the circulating pipe line 11 at 11a and circulate in the compartment 3 where it will absorb heat and finally enter the deflector valve through the pipe 19. It will then pass through the pipe 18 to the lower compartment 7 and will pass through the perforations into and around the frozen carbon dioxide cubes 9 of the compartment 4b.

The gas having accumulated in the pipes 11 and absorbing heat, as previously stated, from the car compartment 3, will be comparatively warm upon entering the chamber 7 and will deliver heat to the frozen carbon dioxide, thereby stimulating evaporation and causing a greater volume of carbon dioxide gas to circulate in pipe 12.

After passing through the circulating pipe 12 it will pass out to atmosphere through the pipe 21 to 22.

The gas entering the compartment 7 from the deflector valve, in other words, through the pipe 18 from the pipe 19, will also partially stimulate evaporation in compartment 4a since the partition wall 8 is preferably metallic and therefore a good heat conductor.

The gases circulating in the manner described, will cool off the compartment 3 to the desired temperature and when such temperature is reached, the surface tension of the liquid in the bulb 13 will have fallen since the bulb temperature has reached that of the refrigerator compartment 3, the spring 36 which is calibrated to correspond to a predetermined pressure in the bulb 13 in accordance with the desired temperature in compartment 3, will begin to overcome the gas pressure in the chamber of cylinder 15 and will displace the disk 30 towards its extended position. As this process is gradual, the deflector valve 24 will gradually move from the position referred to, to the position shown in full in Figure 2, thus for a period it will split the gas flow from pipe 19 to make a partial flow to the atmosphere through pipe 17 and to the chamber 7 through pipe 18 until it finally establishes full communication of pipe 19 with the pipe 17 leading to atmosphere.

In the construction of the frozen carbon dioxide compartments, compartment 4b should be well insulated as also should compartment 4a, although the wall toward the car compartment 3 may be of lighter insulation to stimulate evaporation.

The temperature of the evaporation of frozen carbon dioxide at atmospheric pressure is very low, namely, minus 109° F. but the evaporated dry carbon dioxide gas tends strongly to insulate if undisturbed by gas currents. Hence to stimulate evaporation, the gas from the compartment 4a after being heated in compartment 3, is led into compartment 4b when necessary.

It is evident from the foregoing description of the invention that the main object is the utilization of evaporated gas from one or more compartments to stimulate evaporation in another or other compartments as the case may be, and to this end the apparatus herein described is efficient in maintaining a desired temperature in a cooling or freezing compartment in the manner described.

Although one embodiment of the invention has been herein illustrated and described, it will be obvious to those skilled in the art that various modifications may be made in the details of construction without departing from the principles herein set forth.

I claim:

1. A refrigerating system for frozen carbon dioxide comprising a plurality of evaporating chambers, and means for causing the carbon dioxide gas generated in one or more of said chambers to stimulate evaporation in other chambers.

2. A refrigerating system for frozen carbon dioxide comprising a refrigerating chamber and a plurality of frozen carbon dioxide compartments, means for evaporating frozen carbon dioxide in one of said frozen carbon dioxide compartments and circulating the gas through the refrigerating chamber and back to another of said frozen carbon dioxide compartments whereby to stimulate the evaporation of the frozen carbon dioxide in said last named compartment for circulation of the gases through said refrigerating chamber.

3. A refrigerating system for frozen carbon dioxide comprising a refrigerator chamber and a plurality of frozen carbon dioxide compartments, a system of piping establishing communication between said frozen carbon dioxide compartments and causing circulation of carbon dioxide gases from said frozen carbon dioxide compartments through said refrigerator chamber, valve means in said system of piping controlling the passage of said gases from one of said frozen carbon dioxide compartments to other of said compartments or to the atmosphere, and means responsive to the temperature changes in said refrigerating chamber to actuate said valve means.

4. A refrigerating system for frozen carbon dioxide comprising a compartment having a perforated support for frozen carbon dioxide cubes in spaced relation with the bottom wall thereof, and having a vertical partition separating said compartment from another frozen carbon dioxide compartment, and means connecting said divided compartments whereby the carbon dioxide gases liberated in said last named compartment may be conducted underneath the perforated support of said other compartment to stimulate generation of carbon dioxide gases therein.

5. In a refrigerating system, a frozen carbon dioxide compartment having side, top, and bottom walls forming a frozen carbon dioxide chamber, a vertical partition dividing said chamber into two compartments, a longitudinal partition having perforations constituting a support for frozen carbon dioxide cubes in one of said compartments, means for establishing communication of one compartment with the bottom of the other of said compartments and means for conducting the gases upward through said perforations to circulate around the frozen carbon dioxide cubes thereby stimulating generation of carbon dioxide gases in said last named compartment.

6. In a refrigerating system, a plurality of chambers utilizing frozen carbon dioxide, a communicating passage for said chambers, a deflector valve for said passage, and fluid pressure means for actuating said valve in response to temperature changes in the refrigerator chamber, said valve comprising a deflector member adapted to control the passage of circulating gases from one frozen carbon dioxide chamber to another or to atmosphere, said deflector valve being actuated in response to pressure variations produced by temperature changes in said refrigerating chamber.

LARS H. VOLD.